(12) United States Patent
Al-Amri

(10) Patent No.: US 9,791,054 B2
(45) Date of Patent: Oct. 17, 2017

(54) ISOLATABLE NON-SLAM PISTON CHECK VALVE

(71) Applicant: Saudi Arabian Oil Company, Dhahran (SA)

(72) Inventor: Omar M. Al-Amri, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 119 days.

(21) Appl. No.: 14/546,209

(22) Filed: Nov. 18, 2014

(65) Prior Publication Data
US 2016/0138723 A1    May 19, 2016

(51) Int. Cl.
| F16K 15/18 | (2006.01) |
| F16K 5/10  | (2006.01) |
| F16K 15/02 | (2006.01) |
| F16K 35/04 | (2006.01) |
| F16K 27/06 | (2006.01) |

(52) U.S. Cl.
CPC ............ *F16K 5/10* (2013.01); *F16K 15/02* (2013.01); *F16K 15/18* (2013.01); *F16K 15/188* (2013.01); *F16K 27/067* (2013.01); *F16K 35/04* (2013.01)

(58) Field of Classification Search
CPC .............................. F16K 15/18; F16K 15/188
USPC ................................ 137/614.2, 240
See application file for complete search history.

(56) References Cited

U.S. PATENT DOCUMENTS

| 1,352,417 | A | * | 9/1920 | Koch ................. B60R 25/042 |
|           |   |   |        | 137/383 |
| 3,491,796 | A | * | 1/1970 | Scaramucci ............. F16K 5/06 |
|           |   |   |        | 137/614.2 |
| 3,854,497 | A |   | 12/1974 | Rosenberg |
| 3,983,899 | A |   | 10/1976 | Graham et al. |
| 4,580,596 | A |   | 4/1986  | Stehling |
| 4,649,952 | A |   | 3/1987  | Jobe |

(Continued)

FOREIGN PATENT DOCUMENTS

| FR | 2649464 A1 | 1/1991 |
| GB | 2230589 A  | 10/1990 |

(Continued)

OTHER PUBLICATIONS

International Search Report and Written Opinion for related PCT application PCT/US2015/061221 dated Apr. 12, 2016.

*Primary Examiner* — Michael R Reid
*Assistant Examiner* — Paul J Gray
(74) *Attorney, Agent, or Firm* — Bracewell LLP; Constance Gall Rhebergen

(57) ABSTRACT

A valve assembly includes a valve body with a central passage, an upstream end for receiving a fluid, and a downstream end for discharging the fluid. A segment ball valve rotates between a valve open position to allow the fluid to flow through the central passage, and a valve closed position to prevent the fluid from flowing through the central passage. A check valve located within the central passage downstream from the segment ball valve is biased to prevent the fluid from traveling upstream through the central passage, and to allow the fluid to travel downstream past the check valve. A locking mechanism secures the check valve in a locked position to prevent the fluid from flowing past the check valve. A sealable cavity is located between the segment ball valve and the check valve, to contain a neutral media to achieve a double block and bleed feature.

5 Claims, 4 Drawing Sheets

(56) References Cited

U.S. PATENT DOCUMENTS

| | | | |
|---|---|---|---|
| 4,846,221 A | | 7/1989 | Kanemaru |
| 5,178,185 A | * | 1/1993 | Stehling ................. F16K 15/18 |
| | | | 137/385 |
| 5,320,181 A | | 6/1994 | Lantier, Sr. et al. |
| 5,373,868 A | | 12/1994 | Rodriguez |
| 5,551,479 A | | 9/1996 | Graves |
| 5,632,294 A | | 5/1997 | Benton |
| 5,944,051 A | | 8/1999 | Johnson |
| 6,098,659 A | * | 8/2000 | Mannis ................. F16K 5/0407 |
| | | | 137/614.17 |
| 7,178,544 B2 | | 2/2007 | Robison |
| 7,445,025 B2 | | 11/2008 | Shafique et al. |
| 2007/0204917 A1 | * | 9/2007 | Clayton ................. E03C 1/106 |
| | | | 137/512 |
| 2007/0215215 A1 | | 9/2007 | Arentsen et al. |
| 2012/0037833 A1 | * | 2/2012 | Miyazaki ........... B65G 53/4658 |
| | | | 251/366 |
| 2014/0034165 A1 | | 2/2014 | Alcaraz Sencianes et al. |

FOREIGN PATENT DOCUMENTS

| | | |
|---|---|---|
| JP | S4854120 U | 7/1973 |
| JP | 11304018 | 11/1999 |

\* cited by examiner

ISOLATABLE NON-SLAM PISTON CHECK VALVE

BACKGROUND OF THE INVENTION

1. Field of the Invention

The present invention relates generally to valves, and in particular to industrial check and block valves.

2. Description of the Related Art

In industrial operations with piping systems, such as hydrocarbon refineries, petrochemical plants, and onshore or offshore hydrocarbon production projects, a standardized piping system can have a set face to face dimension provided for each valve that restricts the valve space within the piping system to assure standardization and interchangeability with any type of valve from different manufacturers for a given pressure system. This spacing standardization is applicable to both block valves, which can open and close to turn a fluid flow on and off, and check valves, which are non-return flow valves.

In such application, the piping systems are often provided with flanges for attachment to the valves. Therefore the spacing allowed for the valve cannot be easily adjusted to allow for a larger valve assembly to be connected between the flanges of the piping system. Each required valve will need to be provided with its own standardized space or length for attaching such valve to the piping system mainly to facilitate future replacement of the valve with a valve from any manufacturer.

In some current piping systems, where a check valve and a separate closure or block valve are needed in the piping system, two standardized valve spaces would be required in the piping system to accommodate the two valves.

In another example, for a double block and bleed operation, two valves are provided that each have an sealing means for creating a barrier to fluid flow in both directions along a pipe of the piping system. Between the two valves of the double block and bleed assembly is a void space that can be vented to confirm that the dual seals are being maintained as required by, for example, the Occupational Safety and Health Administration and by other international safety organizations and practices. Therefore for traditional double block and bleed assemblies, at least two standardized valve spaces would be required in the piping system to accommodate the two valves.

SUMMARY OF THE DISCLOSURE

Embodiments of the present disclosure provide systems and methods that use only one single standard length body to accommodate both a check and block valve. As a result, one valve and one standard space can be eliminated from the piping system and a reduction in weight, space in congested systems such as, for example, in. offshore packages, and overall cost can be achieved. Reducing the number of piping system valve connections will also reduce fugitive emissions to the environment and reduce the number of separate valve connections to be verified, maintained, and repaired. Using a segment ball valve will provide sufficient internal space with the disclosed valve orientation to accommodate the second valve member, without the segment ball valve and second valve member coming in contact at any occasion. The cavity between both valve members can be a neutral zone and can be used to check the sealing integrity of both valves in the closed position. When downstream hot work is to be performed, this cavity can be injected with a neural media, such as nitrogen or other known inert gas or liquid, to provide neutral blanket against a flow of flammable fluid coming from the upstream direction. Therefore embodiments of this disclosure provide a valve assembly that has a single valve body with two separate independently sealing valves that can be used in double block and bleed operations for on-stream hydrocarbon segregation.

In an embodiment of this disclosure, a valve assembly includes a valve body with a central passage having a central axis. The valve body has an upstream end for receiving a fluid, and a downstream end for discharging the fluid. A segment ball valve is operable to rotate between a valve open position to allow the fluid to flow through the central passage and a valve closed position to prevent the fluid from flowing through the central passage. A check valve is located within the central passage downstream from the segment ball valve. The check valve is biased to prevent the fluid from traveling upstream through the central passage and to allow the fluid to travel downstream past the check valve. A locking mechanism selectively secures the check valve in a locked position to prevent the fluid from flowing past the check valve. A cavity is located between the segment ball valve and the check valve. The cavity is sealable between the segment ball valve in the valve closed position and the check valve in the locked position, to contain a neutral media.

In alternate embodiments, the valve body is a single member valve body and the segment ball valve and the check valve are located within the central passage. The valve body can include an upstream flange and a downstream flange, the flanges selectively connecting the valve assembly to a standardized flanged piping system. The valve assembly can have a port extending into the cavity for injecting the neutral media into the cavity.

In other alternate embodiments, the locking mechanism comprises two manual needle locks operable to secure a sealing surface of the check valve against a check valve seat located in the central passage. The locking mechanism can engage a downstream facing surface of the check valve piston. The check valve can be spaced axially from the segment ball valve when the ball valve is in both the valve open position and the valve closed position. The check valve can have a spring circumscribing the piston stem, urging the sealing surface in an upstream direction. When the segment ball valve is in the valve closed position, the fluid is prevented from reaching the check valve and the check valve is urged to a check valve closed position by the compressed spring. The check valve can be a piston check valve having a check valve piston with an upstream facing sealing surface and a piston stem extending from the check valve piston in a direction opposite the sealing surface.

In an alternate embodiment of this disclosure, a valve assembly includes a single member valve body having a central passage with a central axis. The valve body has an upstream end for receiving a fluid and a downstream end for discharging the fluid. The valve body also has a ball valve seat and a check valve seat. The ball valve seat is annular and located on an inner diameter of the central passage. The check valve seat is annular and located on an inner diameter of the central passage. The segment ball valve seat is closer to the upstream end and the check valve seat is closer to the downstream end. A cavity is located between the segment ball valve seat and the check valve seat. A segment ball is operable to rotate between a valve open position with the segment ball spaced from the valve seat, and a valve closed position with the segment ball in sealing engagement with the valve seat. A check valve piston is biased to prevent the fluid from traveling upstream through the central passage and to allow the fluid to travel downstream past the check valve piston. A locking mechanism selectively engages the check valve piston and secures the check valve piston in a locked position in sealing engagement with the check valve seat. The cavity has a sealed space when the segment ball is in the valve closed position and the check valve piston is in the locked position.

In other alternate embodiments, the valve body can include an upstream flange and a downstream flange, the flanges selectively connecting the valve assembly between flanges of a standardized piping system. A vent can extend into the cavity for selectively venting the fluid located in the cavity when the segment ball is in the valve closed position and the check valve piston is in the locked position. A port can extend into the cavity for injecting a neutral media into the cavity through the port. The locking mechanism can include two manual needle locks operable to engage a downstream facing surface of the check valve piston. When the segment ball is in the valve closed position, the fluid can be prevented from reaching the check valve piston and the check valve piston can be urged to a check valve closed position. The check valve piston can be spaced axially from the segment ball when the segment ball is in both the valve open position and the valve closed position.

In yet another alternate embodiment of this disclosure, a method for controlling flow of a fluid includes providing a valve assembly having a single valve body with both a segment ball valve and a check valve located within a central passage of the valve body. The segment ball valve has a valve open position to allow the fluid to flow through the central passage. The check valve is biased to prevent the fluid from traveling in an upstream direction through the central passage and to allow the fluid to travel in a downstream direction past the check valve. The segment ball valve is rotated to the valve closed position to prevent the flow of the fluid through an upstream end of the central passage. A locking mechanism of the valve assembly is moved to a locked position to secure the check valve in a locked position. A neutral media is contained in a cavity located between the segment ball valve and the check valve.

In other alternate embodiments, the neutral media can be injected into the cavity through a port that extends through the valve body. A seal integrity of the ball valve and the check valve can be confirmed by monitoring the pressure of the neutral media. The valve assembly can have an upstream flange and a downstream flange, and the valve assembly can be secured between two flanges of a standardized flanged piping system with the upstream flange and the downstream flange. A needle lock can be manually operated to secure a sealing surface of the check valve to a check valve seat located in the central passage.

BRIEF DESCRIPTION OF THE DRAWINGS

So that the manner in which the above-recited features, aspects and advantages of the invention, as well as others that will become apparent, are attained and can be understood in detail, a more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION OF THE EXEMPLARY EMBODIMENTS

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments or positions.

In the following discussion, numerous specific details are set forth to provide a thorough understanding of the present invention. However, it will be obvious to those skilled in the art that the present invention can be practiced without such specific details. Additionally, for the most part, details concerning well drilling, reservoir testing, well completion and the like have been omitted inasmuch as such details are not considered necessary to obtain a complete understanding of the present invention, and are considered to be within the skills of persons skilled in the relevant art.

Figure 1:
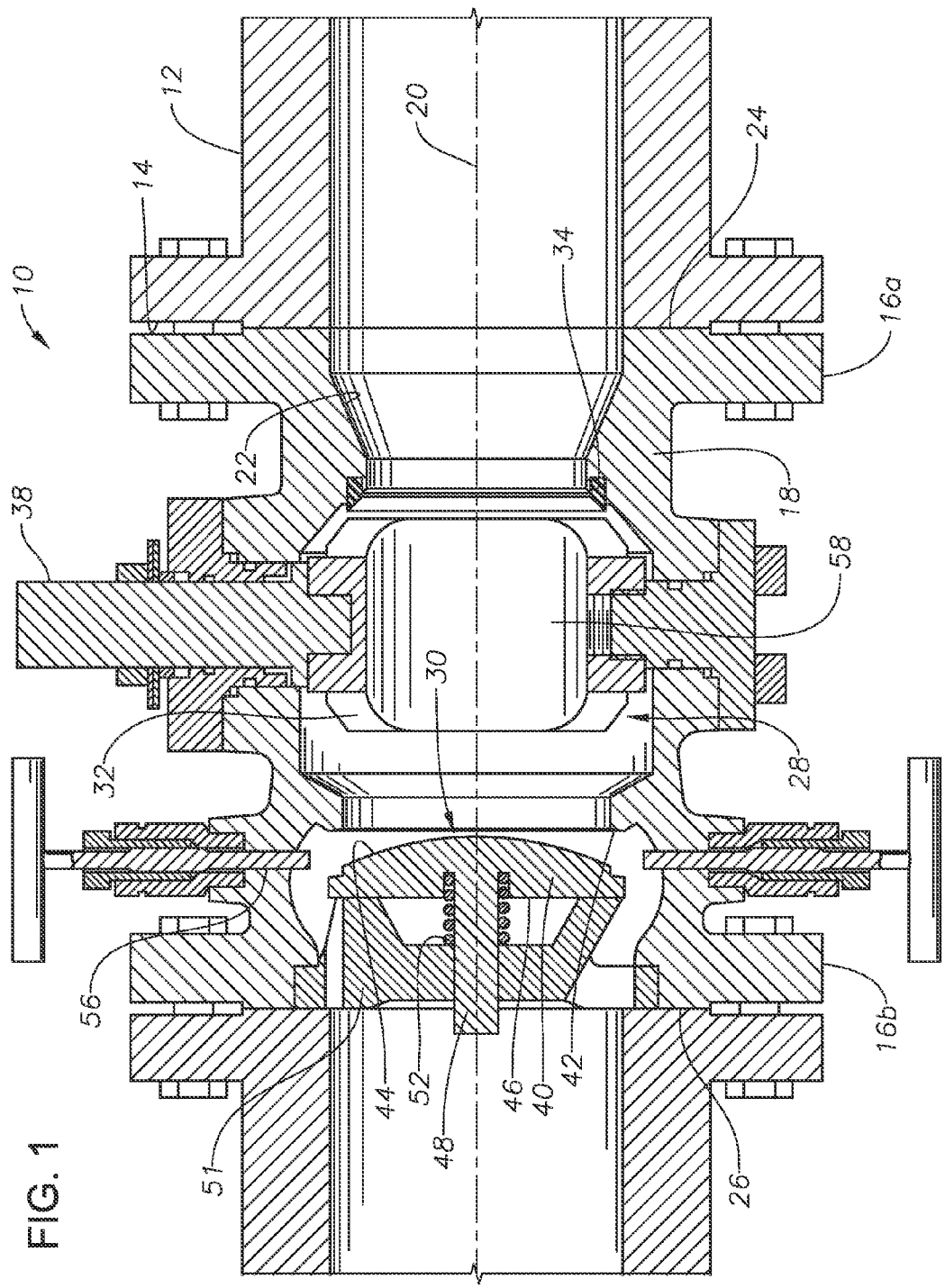
FIG. 1 is a section view of a piping system including a valve assembly of an embodiment of this disclosure, shown with the segment ball valve in the valve open position and the check valve in an open and unlocked position.

Referring to FIG. 1, valve assembly 10 is part of piping system 12. Piping system 12 can be a standardized piping system with a set or predetermined face to face dimension between flange faces 14 of piping system flanges for accommodating valves, to allow standardization and interchangeability with any type of valve from different manufacturers. Piping system 12 can be associated with, for example, a hydrocarbon refinery, petrochemical plant, onshore or offshore hydrocarbon production projects, or other industrial applications with large diameter flanged piping connections. Valve assembly 10 can be located downstream of a pump or compressor or other critical rotating equipment. Valve assembly 10 can have an upstream flange 16a and a downstream flange 16b, for connecting valve assembly 10 to flange faces 14 of piping system 12. Valve assembly 10 can be connected to piping system 12 with connectors, such as for example, clamps, bolts or other threaded members.

Figure 2:
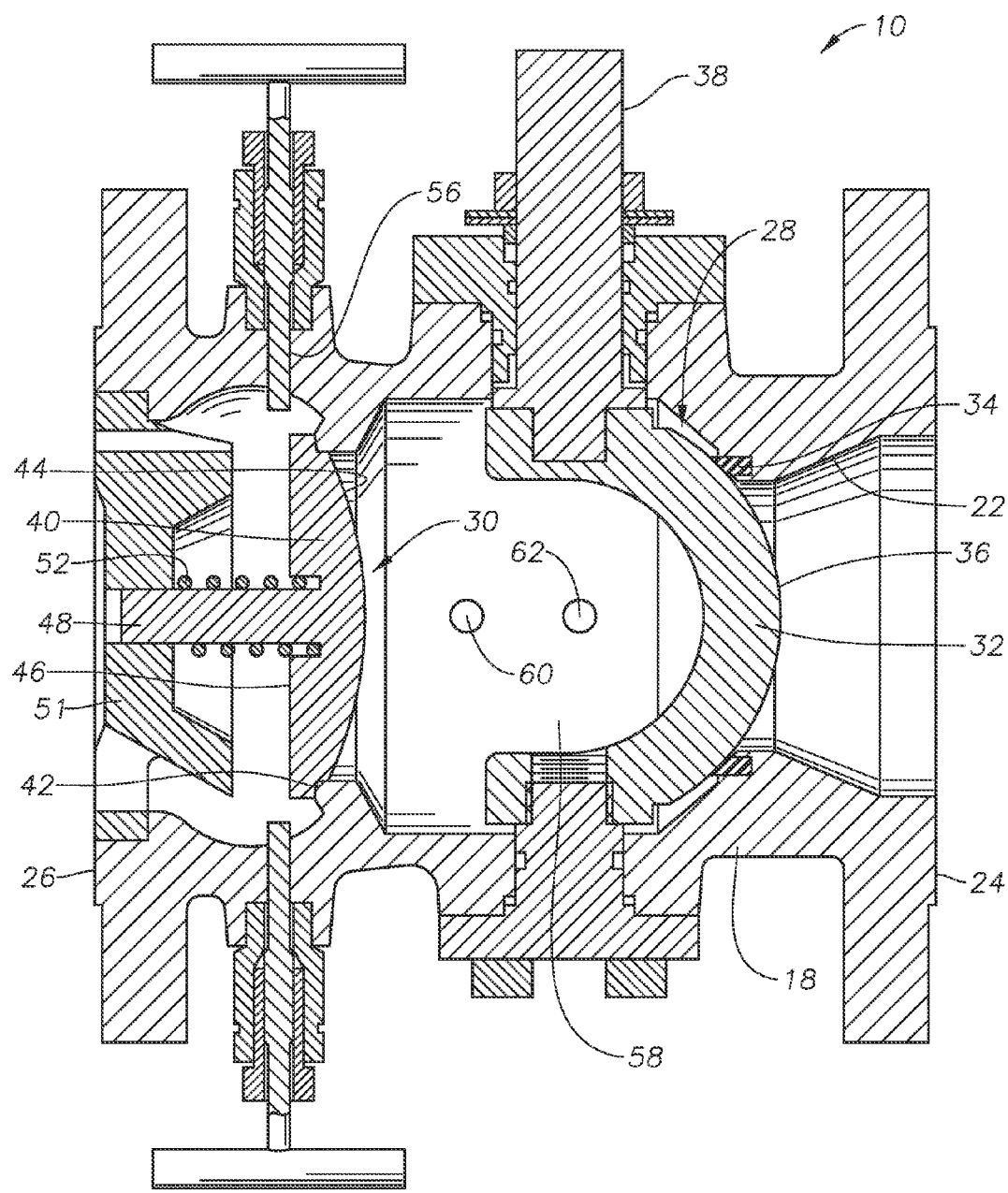
FIG. 2 is a section view of the valve assembly of FIG. 1, shown with the segment ball valve in the valve closed position and the check valve in a closed and unlocked position.
Figure 3:
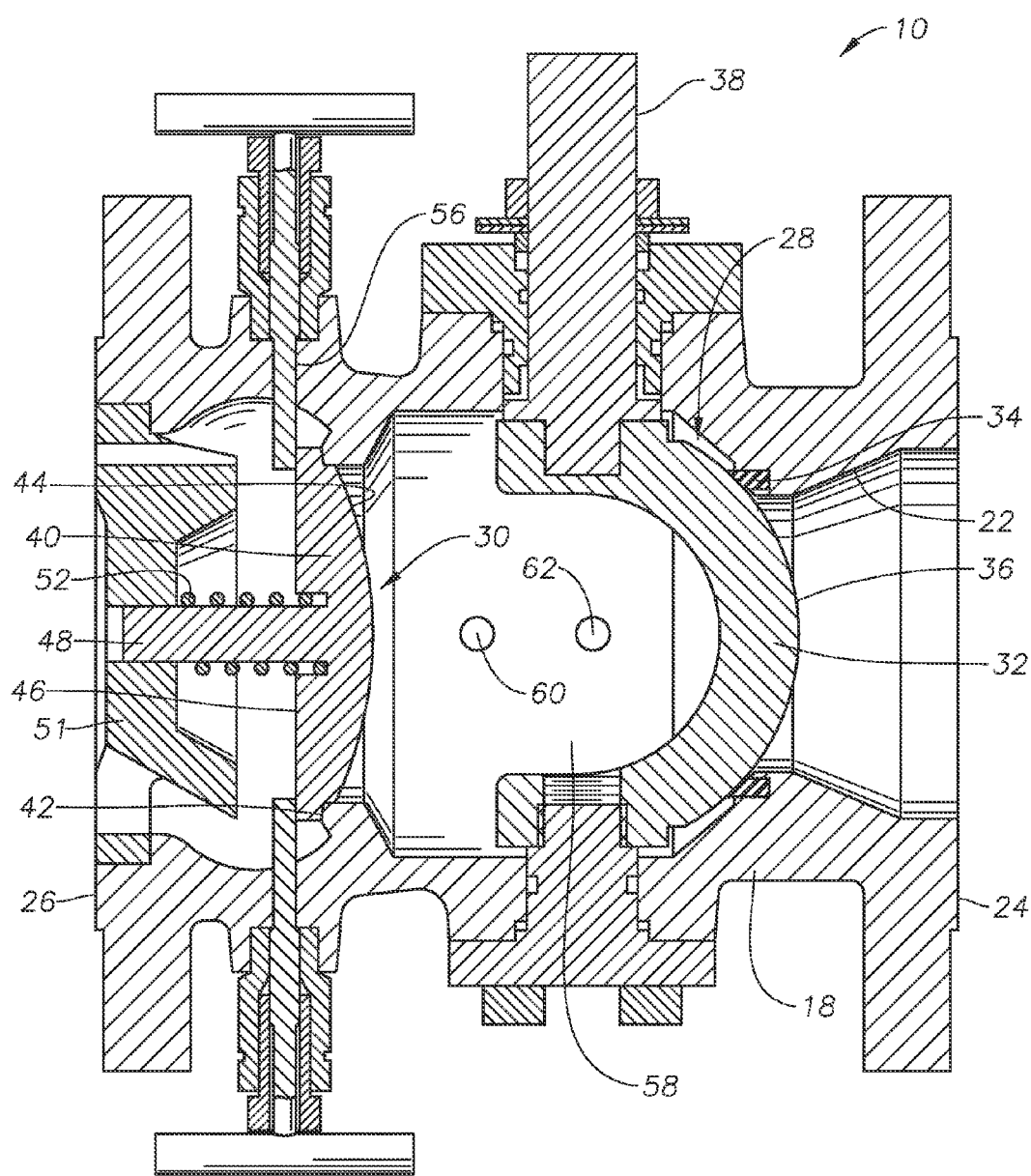
FIG. 3 is a section view of the valve assembly of FIG. 1, shown with the segment ball valve in the valve closed position and the check valve in a closed and locked position.

Looking at FIGS. 1-3, valve assembly 10 includes valve body 18 that has central axis 20. Valve body 18 is a single member body with a length along axis 20 that equals a standard face to face dimension for a single valve of piping system 12. Valve body 18 has central passage 22 that is symmetrical about central axis 20 and extends from upstream end 24 of valve body 18 to downstream end 26 of valve body 18. Fluid traveling within piping system 12 during normal operations is received through upstream end 24 of valve body 18 and discharged out of the downstream end 26 of valve body 18.

Segment ball valve 28 and check valve 30 are both contained within central passage 22. In the example embodiment shown, segment ball valve 28 has segment ball 32 and ball valve seat 34. Segment ball 32 has an outer surface 36 that is shaped as a partial sphere. Segment ball 32 has an inner surface that is shaped as a partial cylinder. Ball valve seat 34 is an annular shaped seal member located on an inner diameter of central passage 22. Ball valve seat 34 has a smooth surface for engaging segment ball 32 and can be a separate member or can be an integral part of central passage 22.

Segment ball 32 of segment ball valve 28 can rotate between a valve open position (FIG. 1) and a valve closed position (FIGS. 2-3). In the valve open position, fluid can flow through central passage 22 past segment ball valve 28. In the valve closed position fluid is prevented from flowing through the central passage 22 past segment ball valve 28. In the valve open position, segment ball 32 is spaced from ball valve seat 34 and the inner surface of segment ball valve 28 aligns along central passage 22 to allow fluid to flow past segment ball valve 28. In the valve closed position outer surface 36 of segment ball 32 is in sealing engagement with ball valve seat 34 to block fluid flow through central passage 22.

Segment ball valve 28 includes a means for rotating segment ball 32 between the valve open position and the valve closed position. In the example embodiments of FIGS. 1-3, stem 38 can be used to rotate segment ball 32 between the valve open position and the valve closed position. Stem 38 is shown extending vertically from valve body 18 to rotate segment ball 32 around a vertical stem axis perpendicular to central axis 20. In alternate embodiments, stem 38 can extend horizontally from valve body 18 to rotate segment ball 32 around a horizontal stem axis perpendicular to central axis 20.

Check valve 30 is a non-return flow valve and is located within central passage 22 downstream from segment ball valve 28 so that fluid in piping system 12 and received through upstream end 24 of valve body 18 would have to first flow past segment ball valve 28 before reaching check valve 30. Check valve 30 can be a non-slam check valve. Check valve 30 is spaced axially apart from segment ball valve 28 and does not contact or interfere with segment ball valve 28 when segment ball valve 28 is in the valve open position, the valve closed position, or moving between the valve open position and the valve closed position.

In the example embodiment shown in FIGS. 1-3, check valve 30 is a piston check valve having check valve piston 40 and check valve seat 42. Check valve piston 40 has an upstream facing sealing surface 44 and a downstream facing surface 46 opposite the upstream facing sealing surface 44. Piston stem 48 extends from check valve piston 40 in a direction opposite sealing surface 44. Piston stem 48 extends into check valve base 51. Check valve base 51 is located downstream of check valve seat 42 and has a central opening for accepting piston stem 48.

Check valve piston 40 is biased to prevent fluid from traveling upstream through central passage 22 past check valve 30 but will allow the fluid to travel downstream past check valve 30. In the example embodiment, check valve 30 has spring 52. Spring 52 circumscribes piston stem 48 and has a first end that engages downstream facing surface 46 of check valve piston 40 and a second end that engages check valve base 51. Spring 52 urges sealing surface 44 in an upstream direction and into sealing engagement with check valve seat 42.

Check valve seat 42 has an annular shaped seal surface and is located on the inner diameter of central passage 22. Ball valve seat 34 is closer to upstream end 24 and check valve seat 42 is closer to downstream end 26. Check valve seat 42 has a smooth seal surface for engaging sealing surface 44 and can be a separate member or can be an integral part of central passage 22. When segment ball valve 28 is in the valve open position, fluid flows past segment ball valve 28 and can reach check valve 30 with sufficient force to overcome the force of spring 52 to move check valve piston 40 away from check valve seat 42 and into a check valve open position (FIG. 1) so that fluid can flow past check valve 30 and out of downstream end 26 of valve assembly 10. In the check valve open position, downstream facing surface 46 of check valve piston 40 can contact check valve base 51, limiting further downstream movement of check valve piston 40. When segment ball valve 28 is in the valve closed position, the fluid is prevented from reaching check valve 30 and sealing surface 44 of check valve piston 40 is urged to a check valve closed position (FIGS. 2-3) by spring 52 where sealing surface 44 is in sealing engagement with check valve seat 42.

Figure 4:
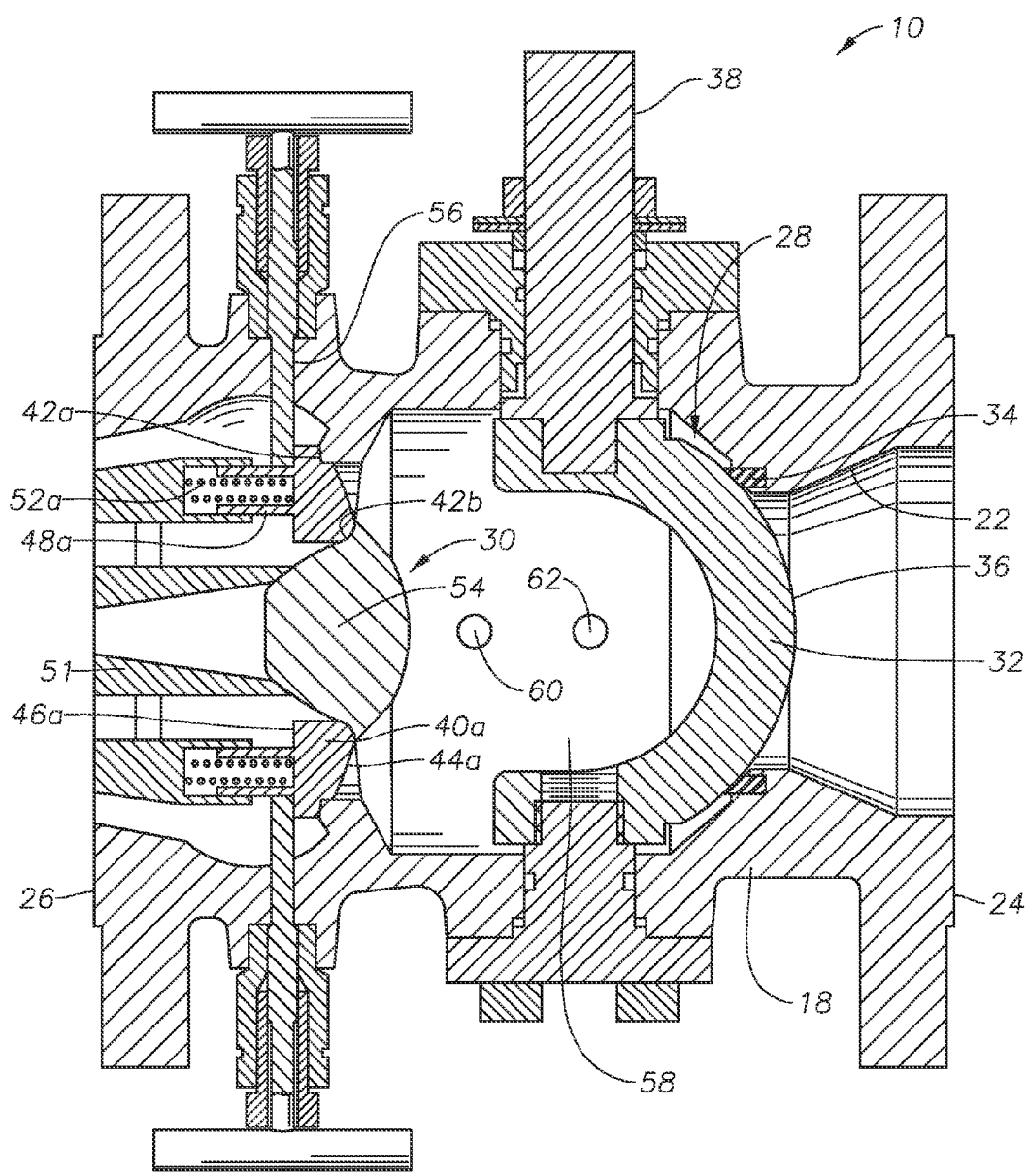
FIG. 4 is a section view of a valve assembly of an embodiment of this disclosure, shown with the segment ball valve in the valve closed position and the check valve in a closed and locked position.

Turning now to FIG. 4, in an alternate embodiment, check valve 30 can instead be a disk check valve. Check valve piston 40a is a ring shaped member with upstream facing sealing surface 44a and downstream facing surface 46a opposite the upstream facing sealing surface 44a. Piston stem 48a is a ring shaped member that extends from downstream facing surface 46a of check valve piston 40a in a direction opposite sealing surface 44a. Piston stem 48a extends into check valve base 51a. Check valve base 51a is located downstream of check valve seats 42a and 42b. Check valve base 51a can have an annular groove to accommodate piston stem 48a. Check valve base can include a hub 54 which is located at an end of check valve 30 closest to ball valve 28.

Check valve piston 40a is biased to prevent fluid from traveling upstream through central passage 22 past check valve 30 but will allow the fluid to travel downstream past check valve 30. In the example embodiment of FIG. 4, check valve 30 has at least one spring 52a. Spring 52a has a first end that engages downstream facing surface 46a of check valve piston 40a and a second end that engages check valve base 51a. Spring 52a urges sealing surface 44a in an upstream direction and into sealing engagement with check valve seats 42a and 42b.

Check valve seat 42a has an annular shaped seal surface and is located on the inner diameter of central passage 22. Check valve seat 42a engages sealing surface 44 proximate to an outer diameter of check valve piston 40a. Check valve seat 42b has an annular shaped seal surface and is located on a downstream facing portion of hub 54. Check valve seat 42b engages sealing surface 44 proximate to an inner diameter of check valve piston 40a. The operation of check valve 30 as disk check valve as shown in FIG. 4, corresponds to the use and functionality of check valve 30, as shown in FIGS. 1-3, with the numbers that include "a" and "b" suffixes in FIG. 4 operating in the same manner as the numbered elements of FIGS. 1-3, without the "a" and "b" suffixes.

Looking now at FIGS. 1-4, valve assembly 10 further includes a locking mechanism. The locking mechanism can secure check valve 30 in a locked position (FIG. 3-4) with sealing surface 44 in sealing engagement with check valve seat 42, to prevent fluid from flowing downstream past check valve 30, regardless of the fluid pressure exerted on sealing surface 44 of check valve 30. In the example embodiment shown, the locking mechanism includes two needle locks 56 that can engage downstream facing surface 46 of check valve piston 40 to secure sealing surface 44 against check valve seat 42. Needle locks 56 can be manually operated with handles, as shown, or can be hydraulically or otherwise mechanically operated.

Valve assembly 10 includes cavity 58 located between segment ball valve 28 and check valve 30. Cavity 58 is sealable to create a sealed space that is capable of being pressurized, between segment ball valve 28 and check valve 30 when segment ball valve 28 is in the valve closed position and check valve 30 in the locked position (FIG. 3). Port 60 extends through a sidewall of valve body 18 and into cavity 58 and can be used to inject neutral media into cavity 58. The neutral media can be, for example, air, water, or other inert liquids and gasses. Vent 62 can also extend through a sidewall of valve body 18 and into cavity 58 and can be used to vent fluid or other material within cavity 58 out of cavity 58. Port 60 and vent 62 have been shown, as an example, as being located on a side of valve body 18 and in alternate embodiments can be located proximate or on a top or bottom of valve body 18.

In an example of operation, looking at FIG. 1, in order to control the flow of fluid in piping system 12, valve assembly 10 can be secured between flange faces 14 of piping system 12 within a standardized spacing generally sized to accommodate a single valve. Upstream flange 16a and downstream flange 16b of valve assembly 10 can be bolted or otherwise attached to flange faces 14. With segment ball valve 28 in a valve open position and check valve 30 in an unlocked position, fluid flowing with sufficient force to overcome the forces of spring 52 can move check valve 30 to an open position. In this way, fluid can enter central passage 22 of valve body 18 through upstream end 24 of valve body 18 and can exit central passage 22 of valve body 18 out of the downstream end 26 of valve body 18.

Turning to FIG. 2, by rotating stem 38, segment ball 32 of segment ball valve 28 can move segment ball valve 28 to a valve closed position. This will stop the flow of fluid through the upstream end of central passage 22 of valve assembly 10, upstream of segment ball valve 28, by pressing outer surface 36 into sealing engagement with ball valve seat 34. As the flow of fluid through central passage 22 is stopped, check valve piston 40 will be urged by spring 52 towards check valve seat 42 and sealing surface 44 will engage check valve seat 42 so that check valve 30 is in a closed position. Looking now at FIG. 3, check valve 30 can then be secured in a locked position by moving needle locks 56 of the locking mechanism so that sealing surface 44 of check valve 30 remains sealingly engaged with check valve seat 42.

In this state, cavity 58 is sealed and can be vented and pressurized. By opening vent 62, any fluids remaining in cavity 58 can be vented and drain out of cavity 58. A neutral media can be injected through port 60 and into cavity 58 to flush cavity 58 of any potential flammable fluids or to pressurize cavity 58. The integrity of the seal formed between segment ball 32 and ball valve seat 34, and the seal formed between check valve piston 40 and check valve seat 42, can be tested and confirmed by monitoring the pressure of the neutral media being injected into cavity 58.

This procedure can be undertaken to achieve a double block and bleed compulsory condition whenever decision is made to perform downstream hot work. Containing neutral media in cavity 58 will assure no flammable fluids can pass from upstream of valve assembly 10 and through valve assembly 10 to the hot-work location. Injecting neutral media into cavity 58 and maintaining the pressure of the neutral media in cavity 58 will provide the required safe neutral zone. The neutral media will apply pressure in the inner surface of segment ball 32 and push outer surface 36 against ball valve seat 34, improving the seal between segment ball 32 and ball valve seat 34. As the same time, the neutral media will apply pressure to sealing surface 44 of check valve piston 40, in a direction that would urge sealing surface 44 away from check valve seat 34. However, the locking mechanism will act to retain the sealing surface 44 of check valve 30 in sealing engagement with check valve seat 42. After the seal integrity of cavity 58 is shown be stable, and any flammable fluids leftover downstream of segment ball valve 28 is eliminated, downstream hot-work activity can be started.

Therefore embodiments of this disclosure provide systems and methods include valve assembly 10 with valve body 18 having an axial length of a single valve but capable of accommodating both a closure element in the form of segment ball valve 28 plus a non-return flow valve in the form of check valve 30, to form a dual function valve. Embodiments of this disclosure provide a double closure mechanism, as required for double block and bleed operations, within a standard face to face dimension of a single valve. This saves space, weight and cost compared to instead providing two separate valves, each having an axial length of a single valve. Embodiments of this disclosure also minimize the number of piping joints, reducing fugitive emission to environment.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:
1. A valve assembly comprising:
an integrally formed single member valve body comprising:
 a central passage having a central axis;
 an upstream end for receiving a fluid and a downstream end for discharging the fluid;
 a ball valve seat, the ball valve seat being annular and located on an inner diameter of the central passage;
 a check valve seat, the check valve seat being annular and located on the inner diameter of the central passage of the same integrally formed single member valve body as the ball valve seat, the ball valve seat being closer to the upstream end and the check valve seat being closer to the downstream end; and
 a cavity located between the ball valve seat and the check valve seat;
a segment ball operable to rotate between a valve open position with the segment ball spaced from the ball valve seat and a valve closed position with the segment ball in sealing engagement with the ball valve seat;
a check valve piston biased to prevent the fluid from traveling upstream through the central passage and to allow the fluid to travel downstream past the check valve piston the check valve piston having an upstream facing sealing surface and a downstream facing surface opposite the upstream facing sealing surface;

a locking mechanism selectively engaging the check valve piston and securing the check valve piston in a locked position in sealing engagement with the check valve seat, the locking mechanism directly engaging the downstream facing surface of the check valve piston, wherein the locking mechanism comprises two manual needle locks operable to directly engage the downstream facing surface of the check valve piston; and wherein the cavity comprises a sealed space when the segment ball is in the valve closed position and the check valve piston is in the locked position.

2. The valve assembly according to claim 1, wherein the single member valve body includes an upstream flange and a downstream flange, the upstream and downstream flanges selectively connecting the valve assembly between flanges of a standardized piping system.

3. The valve assembly according to claim 1, further comprising:

a vent extending into the cavity, the vent providing a fluid flow path operable to vent the fluid located in the cavity when the segment ball is in the valve closed position and the check valve piston is in the locked position; and a port extending into the cavity, the port providing a fluid flow path operable to inject an inert fluid into the cavity through the port.

4. The valve assembly according to claim 1, wherein when the segment ball is in the valve closed position, the fluid is prevented from reaching the check valve piston and the check valve piston is urged to a check valve closed position with a spring.

5. The valve assembly according to claim 1, wherein the check valve piston is spaced axially from the segment ball when the segment ball is in both the valve open position and the valve closed position.

* * * * *